US010489766B2

United States Patent
Chin et al.

(10) Patent No.: US 10,489,766 B2
(45) Date of Patent: Nov. 26, 2019

(54) SYSTEM AND METHOD FOR FACILITATING DETECTION AND PAYMENT OF A PRODUCT

(71) Applicant: MasterCard Asia/Pacific Pte. Ltd., Singapore (SG)

(72) Inventors: Yong How Chin, Singapore (SG); Jiaming Li, Singapore (SG); Hao Tang, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 228 days.

(21) Appl. No.: 15/355,366

(22) Filed: Nov. 18, 2016

(65) Prior Publication Data
US 2017/0161707 A1 Jun. 8, 2017

(30) Foreign Application Priority Data

Dec. 4, 2015 (SG) .................. 10201509999X

(51) Int. Cl.
*G06K 19/07* (2006.01)
*G06Q 20/20* (2012.01)
(Continued)

(52) U.S. Cl.
CPC ......... *G06Q 20/202* (2013.01); *G06K 7/1417* (2013.01); *G06K 19/06037* (2013.01); *G06Q 20/102* (2013.01)

(58) Field of Classification Search
CPC ................. G06K 19/07; G06K 17/00
(Continued)

(56) References Cited

U.S. PATENT DOCUMENTS 5,729,697 A * 3/1998 Schkolnick .......... G06Q 20/203
235/383
6,032,127 A 2/2000 Schkolnick et al.
(Continued)

FOREIGN PATENT DOCUMENTS

CN 204452538 U 7/2015
JP 08290774 A * 11/1996 .......... G07G 1/0054
(Continued)

OTHER PUBLICATIONS

"PCT Notification of Transmittal of the International Search Report and Written Opinion", International Searching Authority, dated Feb. 2, 2017 (Feb. 2, 2017), for Application No. PCT/SGS2016/050568, 10pgs.

*Primary Examiner* — Russell S Glass
(74) *Attorney, Agent, or Firm* — Buckley, Maschoff & Talwalkar, LLC

(57) ABSTRACT

A system and method for facilitating detection and payment of a product. The product has a radio frequency tag attached thereon and the system comprises: two or more scanners attachable to a container for holding the product, wherein each scanner is configured to: (i) receive tag identification data from the tag when the tag is within communication range of the scanner; (ii) generate a signal that is associated with the tag identification data and a time of receipt of the tag identification data; and a computer server communicatively coupled with the two or more scanners, wherein the computer server is configured to: (i) receive the signals from the two or more scanners; and (ii) determine an identity of the product and a presence of the product in the container based on the signals, wherein the presence of the identified product is used for facilitating payment of the product.

14 Claims, 11 Drawing Sheets

(51) Int. Cl.
  *G06Q 20/10*   (2012.01)
  *G06K 7/14*   (2006.01)
  *G06K 19/06*   (2006.01)

(58) Field of Classification Search
  USPC .......................................................... 705/21
  See application file for complete search history.

(56)         References Cited

U.S. PATENT DOCUMENTS

2005/0149391 A1*  7/2005  O'Shea ................ G06Q 10/087
                                                705/14.38
2013/0080719 A1    3/2013  Connelly

FOREIGN PATENT DOCUMENTS

KR       101424706  B1     8/2014
KR       101426517  B1 *   8/2014   ............. G06K 19/07
KR       101426517  B1     8/2014

* cited by examiner

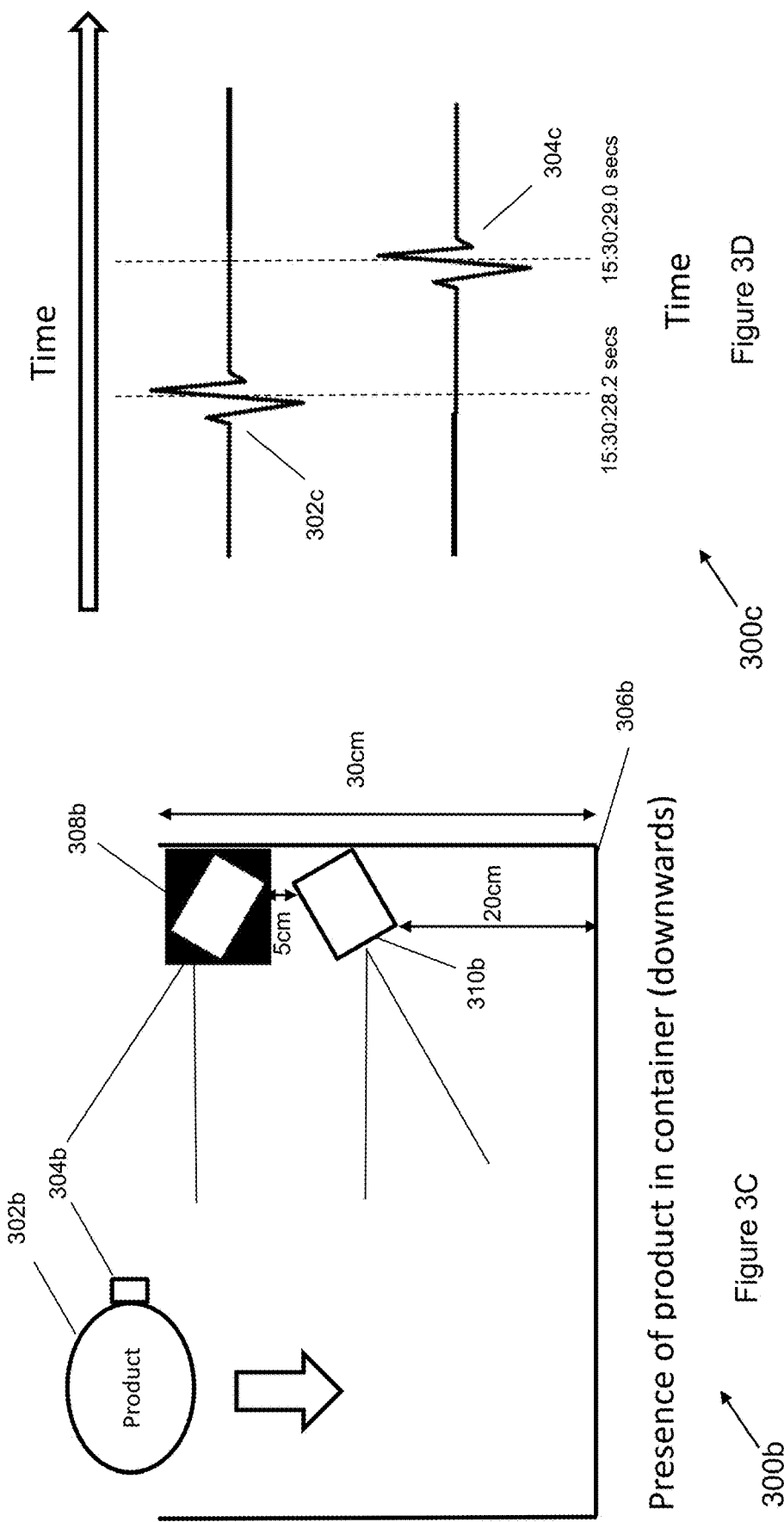

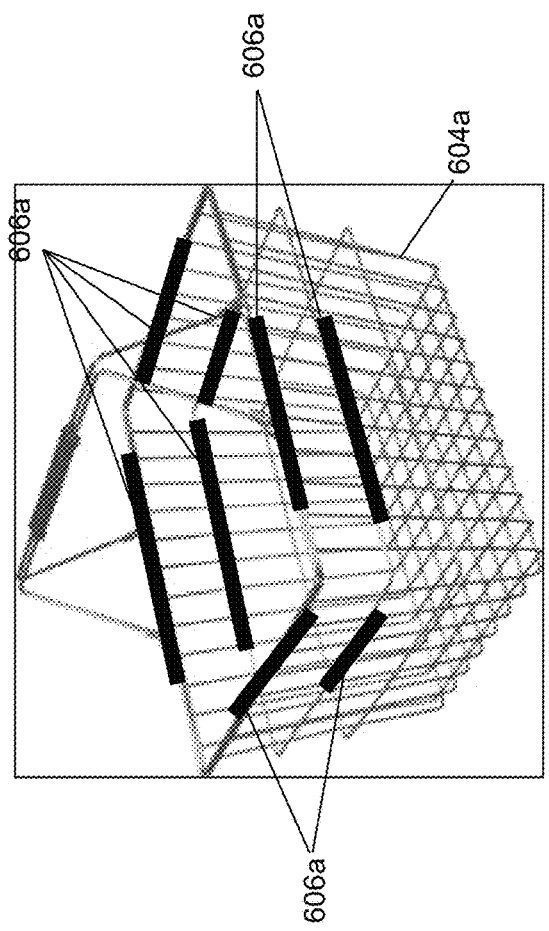
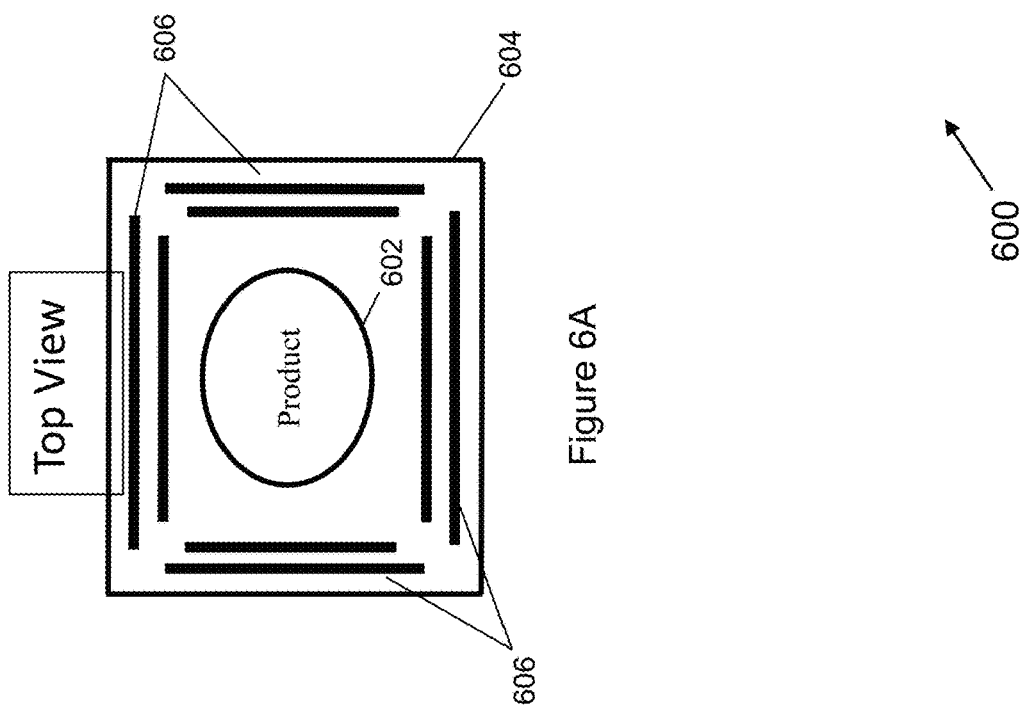
Figure 6B
Figure 6A

SYSTEM AND METHOD FOR FACILITATING DETECTION AND PAYMENT OF A PRODUCT

CROSS-REFERENCE TO RELATED APPLICATION

This application is a U.S. National Stage filing under 35 U.S.C. § 119, based on and claiming benefit of and priority to SG Patent Application No. 10201509999X filed Dec. 4, 2015.

FIELD OF INVENTION

The present disclosure relates to systems and methods for facilitating detection and payment of a product.

BACKGROUND

The use of self-checkout counters with barcode scanners in supermarkets aims to facilitate payment and reduce queues at cashiers. Even though self-checkout counters have reduced such queues, the use of barcode scanners during payment at these self-checkout counters has certain drawbacks. For example, the barcode and the scanner have to be in close proximity in order for the scanner to read the barcode. The maximum distance between the barcode and the scanner is about 4.5 meters and the barcode also has to be in the line of sight of the scanner in order to read the barcode.

Another problem arises when the barcode is not properly printed on the product or when the product is shrink-wrapped or laminated after the barcode is imprinted on the product. This causes the barcode to be unreadable by the scanner. Barcodes are also easily damaged as they have to be exposed on the exterior of the product in order for the scanner to achieve line of sight with the barcode. Security may also be an issue as barcodes can be easily forged and replicated with relatively minimal effort.

Further, queues are not significantly reduced even with the use of self-checkout counters. The time-consuming process of scanning each barcode individually takes up a majority of the time required at the self-checkout counters.

A need therefore exists to provide a method and system for facilitating detection and payment of a product that seeks to address at least some of the above problems.

SUMMARY

According to a first aspect, there is provided a system for facilitating detection and payment of a product, the product having a radio frequency tag attached thereon, the system comprising: two or more scanners attachable to a container for holding the product, wherein each scanner is configured to: (i) receive tag identification data from the tag when the tag is within communication range of the scanner; (ii) generate a signal that is associated with the tag identification data and a time of receipt of the tag identification data; and a computer server communicatively coupled with the two or more scanners, wherein the computer server is configured to: (i) receive the signals from the two or more scanners; and (ii) determine an identity of the product and a presence of the product in the container based on the signals, wherein the presence of the identified product is used for facilitating payment of the product.

In an embodiment, each generated signal may further comprise scanner identification data of a corresponding scanner such that the computer server is further configured to determine an identity of the corresponding scanner based on the signal.

In an embodiment, the system may further comprise a database communicatively coupled to the computer server, the database having stored therein product data corresponding to the product, and wherein the computer server is further configured to retrieve the product data of the identified product from the database for facilitating payment of the product.

In an embodiment, the product data may comprise a price of the product.

In an embodiment, at least one of the two or more scanners may be attached proximate to an opening of the container and at least one other of the two or more scanners may be attached distant to the opening of the container, wherein presence or absence of the product in the container may be determinable based on the respective times of receipt of the signals from the at least one scanner and the at least one other scanner.

In an embodiment, the at least one scanner that is attached proximate to the opening of the container may be tilted upwards towards the opening of the container and the at least one other scanner that is attached distant to the opening of the container may be tilted downwards towards a base of the container.

In an embodiment, the system may comprise at least four scanners and the container may be defined by a first and a second boundary, and at least two scanners are attached to the first boundary and at least two other scanners are attached to the second boundary such that the at least four scanners receive the tag identification data to determine the presence of the product within the first and second boundaries.

In an embodiment, the tag may comprise a Radio Frequency Identification (RFID) tag and each of the scanners comprise a High Frequency (HF) or an Ultra-High Frequency (UHF) RFID scanner.

In an embodiment, the system may further comprise a relay unit communicatively coupled with each of the scanners and the computer server and configured to receive the generated signals from each of the scanners and to relay the generated signals to the computer server.

In an embodiment, the system may further comprise a Point-of-Sale (POS) terminal communicatively coupled with the computer server and configured to retrieve the price of the identified product data from the database for facilitating payment of the product.

In an embodiment, the container may comprise a basket or cart or trolley.

In an embodiment, the system may further comprise a display device that is communicatively coupled to the computer server and configured to display the price of the identified product data or a total price of all products in the container for facilitating payment of the product.

In an embodiment, the computer server may be configured to calculate the total price of each product in the container based on the presence of the product in the container and displays the calculated total price on the display device.

According to a second aspect of the present invention, there is provided a method for facilitating detection and payment of a product, the product having a tag attached thereon, the method comprising: receiving, from two or more scanners attachable to a container for holding the product, tag identification data from the tag when the tag is within communication range of the scanner; generating, at each of the two or more scanners, a signal that is associated with the tag identification data and a time of receipt of the tag identification data; transmitting, by the two or more scanners, the signals to a computer server communicatively coupled with the scanner; and determining, at the computer server, an identity of the product and a presence of the product in the container based on the signals, wherein the presence of the identified product is used for facilitating detection and payment of the product.

BRIEF DESCRIPTION OF THE DRAWINGS

Embodiments will be better understood and readily apparent to one of ordinary skill in the art from the following written description, by way of example only, and in conjunction with the drawings, in which:

FIG. 3C shows a schematic diagram of a system for detecting a presence of a product in a container according to an example embodiment.

FIG. 3D is a schematic graph showing the receipt of tag identification data according to an example embodiment.

FIG. 6A shows a top view of a container for use in facilitating detection and payment of a product according to an example embodiment.

FIG. 6B shows a perspective view of a container for use in facilitating detection and payment of a product according to an example embodiment.

DETAILED DESCRIPTION

Figure 1:
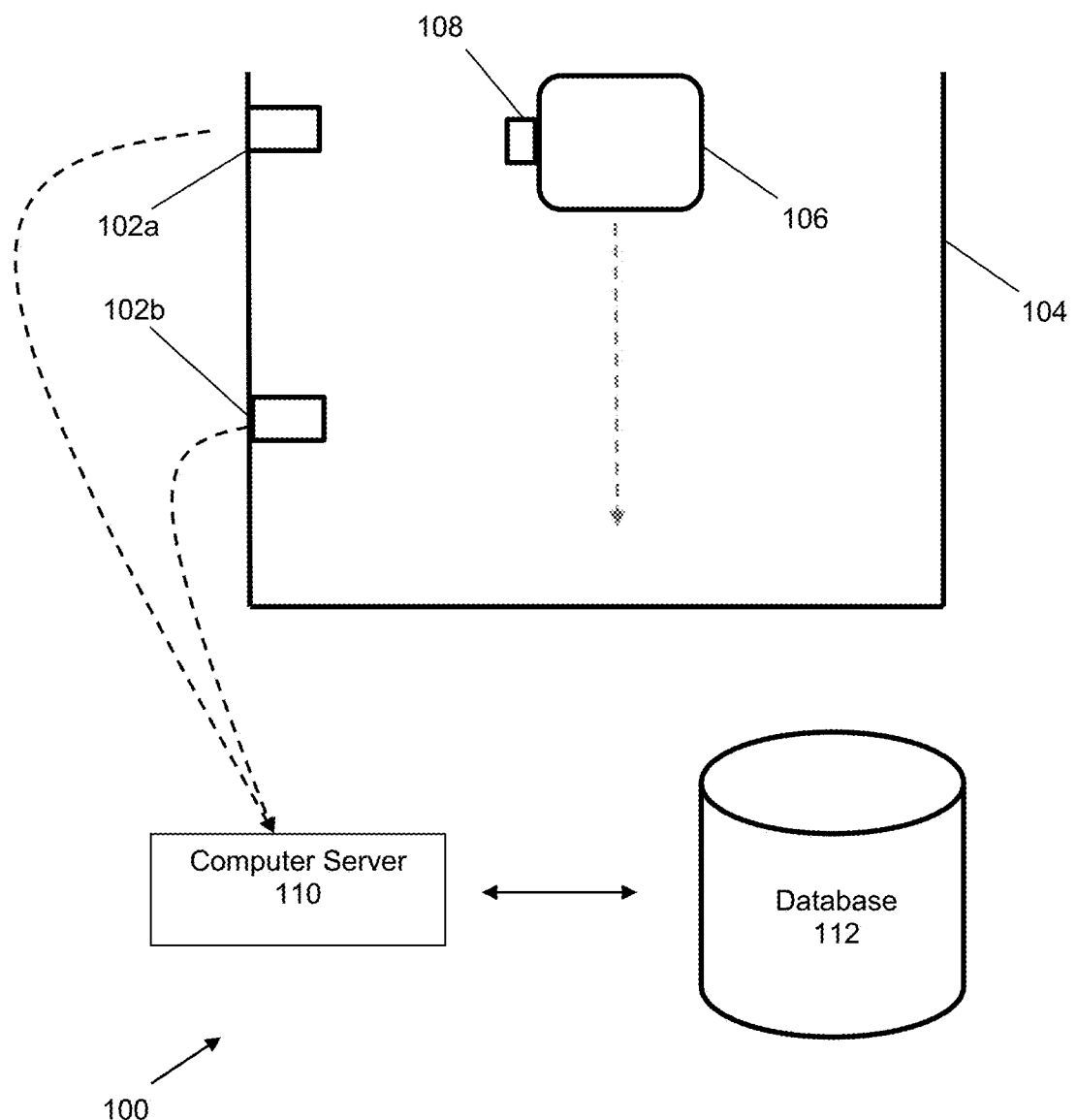
FIG. 1 shows a schematic diagram of a system for facilitating detection and payment of a product according to an example embodiment.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "identifying", "authorizing", "verifying" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

FIG. 1 shows a schematic diagram of a system 100 for facilitating detection and payment of a product according to an example embodiment. The system 100 comprises two or more scanners (only two are shown in FIG. 1-102*a*, 102*b*) attachable to a container 104 for holding a product 106. Each scanner 102*a*, 102*b* is configured to receive tag identification data from a radio frequency tag 108 that is attached to the product 106 when the tag 108 is within communication range of the scanners 102*a*, 102*b*. Subsequently, each scanner 102*a*, 102*b* is configured to generate a signal that is associated with the received tag identification data and a time of receipt of the tag identification data by the respective scanners. In an implementation, the two or more scanners 102a, 102b may be housed within a single scanner body (not shown in FIG. 1) and the single scanner body may be attached to the container 104. The two or more scanners 102a, 102b are spaced apart from each other inside the single scanner body.

A computer server 110 is communicatively coupled with the two or more scanners 102a, 102b and is configured to receive the signals generated by the two or more scanners 102a, 102b. The computer server 110 is further configured to determine an identity of the product 106 and a presence of the product 106 in the container 104 based on the received signals. In this manner, the presence of the identified product 106 in the container 104 can be used for facilitating payment of the product 106. The computer server 110 is also communicatively coupled to a database 112. The database 112 stores product data corresponding to the product 106 and the computer server 110 is configured to receive product data associated with the product 106 from the database 112 based on the tag identification data of the product 106.

The radio frequency tag 108 may be a radio frequency identification (RFID) tag and the scanners 102a, 102b may be High Frequency (HF) or Ultra-High Frequency (UHF) RFID scanners. Line of sight between the scanners 102a, 102b and tag 108 is not necessary in order for the scanners 102a, 102b to receive tag identification data from the tag 108. UHF RFID tags and UHF RFID scanners, which operate within the range of 858 MHz to 960 MHz, have a faster data transfer rate as compared to Low Frequency (LF) or High Frequency (HF) RFID. This allows for relatively faster detection of the product 106 as it is placed inside the container 104. Passive UHF RFID tags are also cheaper and easier to manufacture than LF or HF RFID tags. The container 104 can be a basket, trolley or cart that is currently used in supermarkets. The container 104 can also be any container that is able to hold products to be purchased in a convenience store or warehouse, such as a box or a crate.

In an implementation, one of the two or more scanners 102a is attached proximate to an opening of the container 104 and at least one other of the two or more scanners 102b is attached distant to the opening of the container 104 (e.g. proximate to a base of the container 104). By having the two scanners 102a, 102b spaced from each other between the opening and the base, it is possible to detect (by virtue of the difference in detection times at the two scanners) the placement of a tagged product into, or removal of a tagged product from, the container 104. In an implementation, scanner 102b may be attached at a predetermined height above the base of the container 104 such that an accumulation of products at the base of the container 104 does not prevent the scanner 102b from detecting the presence of newly added products in the container 104. In another implementation, there may be four scanners, wherein a pair of the four scanners may be attached proximate to the opening of the container 104 and the other pair of the four scanners are attached distant to the opening of the container 104. Each of the scanners may comprise a clock or timing module that is configured to identify a time or generate a time-stamp at which it receives the tag identification data from the tag 108. Each of the scanners is further configured to generate a signal that comprises scanner identification data that can be used to uniquely identify each scanner to differentiate one scanner from another. In an example, a scanner 102a has a scanner identification data that identifies it as the top left scanner that is attached to particular supermarket trolley number "A1". That is, the scanner identification data may include the identity of the container that a particular scanner is attached to. In this manner, it is possible to implement various check-out/payment mechanisms for products that are placed inside the container. Thereafter, a signal is generated from the scanner 102a which comprises of (i) the scanner identification data, (ii) the tag identification data and (iii) a time stamp to indicate the time the scanner 102a receives the tag identification data. For example, the signal comprises data indicating that the top left scanner of supermarket trolley number "A1" receives tag identification data at time 22:30:22.5.

Figure 2:
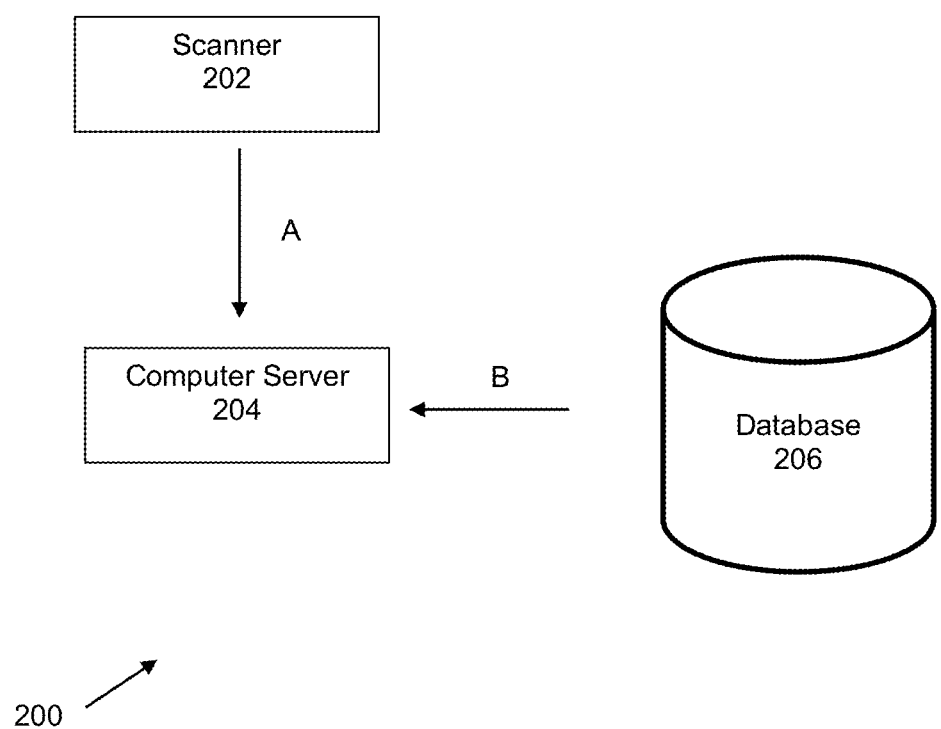
FIG. 2 shows a schematic diagram illustrating the flow of information in a system for facilitating detection and payment of a product according to an example embodiment.

FIG. 2 shows a schematic diagram illustrating the flow of information in a system 200 for facilitating detection and payment of a product according to an example embodiment. In this Figure, facilitation of the payment of a product involves a scanner 202, a computer server 204 and a database 206. The database 206 may be implemented using a server and/or a cloud-computing storage device.

Use of the term "server" herein may be understood to mean a single computing device or a plurality of interconnected computing devices which operate together to perform a particular function. That is, the server may be contained within a single hardware unit or be distributed among several different hardware units. An exemplary computing device which may be operated as a server is described below with reference to FIG. 10.

The computer server 204 is communicatively coupled to the scanner 202. At step A, the computer server 204 receives a signal generated by the scanner 202. The signal is associated with the tag identification data, the time of receipt of the tag identification data and/or the scanner identification data. The signal may be transmitted wirelessly to the computer server 204. In one example, the wireless transmission may be via existing Bluetooth standards, such as IEEE 802.15.1. In another example, the signal may be wirelessly transmitted through existing Wi-Fi IEEE 802.11 standards. The computer server 204 determines an identity of the product and a presence of the product in the container based on the received signal.

The computer server 204 is communicatively coupled to the database 206 which stores product data corresponding to the product. Product data may comprise the price, weight, description or manufacturer of the identified product. Subsequently, at step B, the computer server 204 retrieves product data of the identified product from the database 206. The computer server 204 determines the presence of the identified product based on the time of receipt of the tag identification data from each of the scanners. After the computer server 204 retrieves product data and determines the presence of identified products, the computer server 204 calculates a total price of each product in the container.

For the sake of brevity, the description may refer to single elements (e.g. a single product in a single container). However, it will be appreciated that the various embodiments/implementations described herein are capable of accommodating multiple elements (e.g. multiple products in containers).

Figures 3A, 3B:
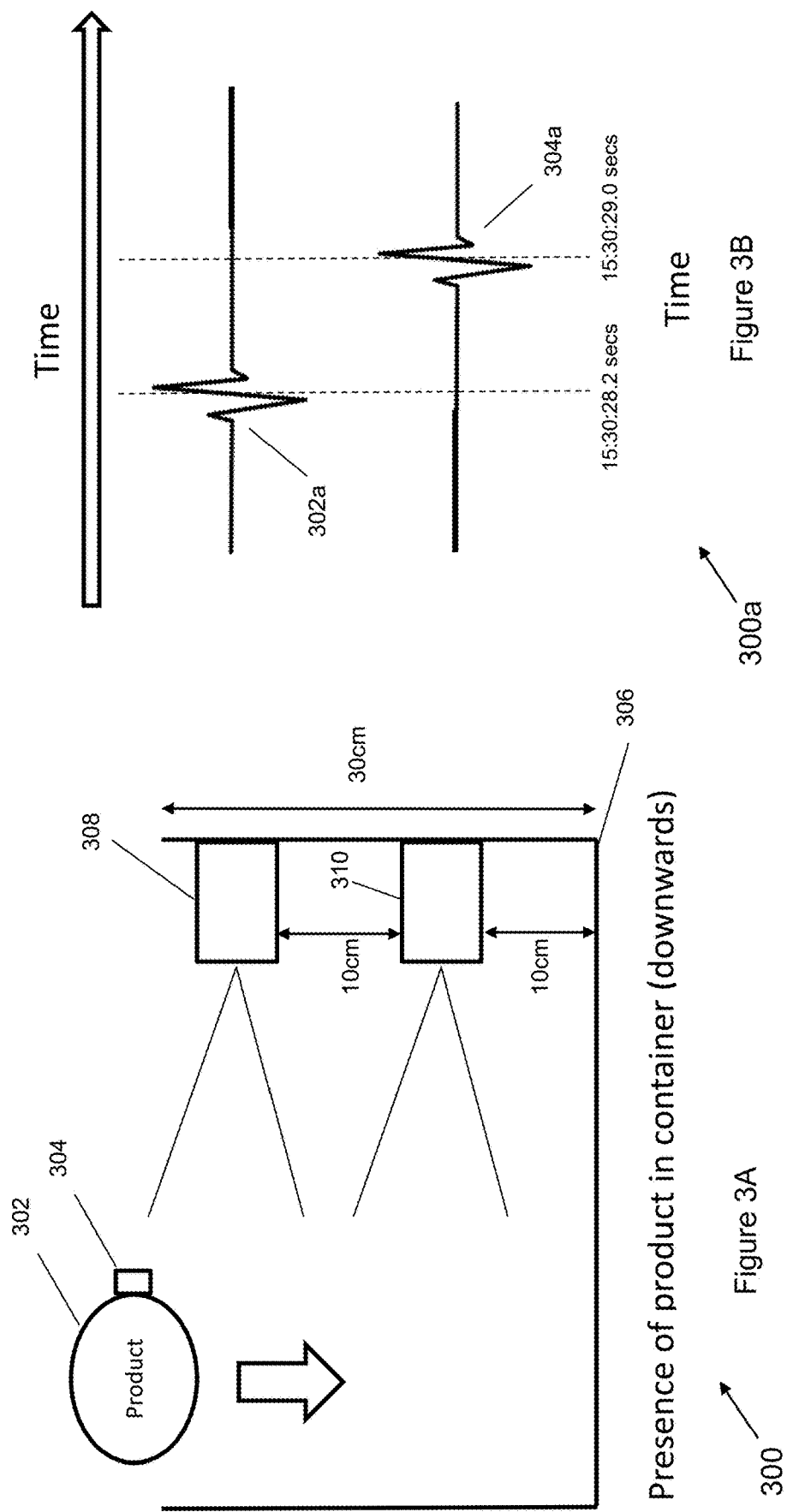
FIG. 3A shows a schematic diagram of a system for detecting a presence of a product in a container according to an example embodiment.
FIG. 3B is a schematic graph showing the receipt of tag identification data according to an example embodiment.

FIG. 3A shows a schematic diagram of a system for detecting a presence of a product in a container according to an example embodiment. In the Figure, a consumer wishes to purchase a product 302. The product 302 has a RFID tag 304 attached thereon. The consumer places the product 302 inside the shopping container 306. A scanner 308 that is attached proximate to the opening of the container 306 first receives a tag identification data from the RFID tag 304 at a certain time (e.g. 15:30:28.2). The scanner 308 may comprise a clock or timing module capable of capturing the time of receipt of the tag identification data. As the product 302 falls toward the bottom of the container 306, a second scanner 310 that is attached distant to the opening of the container 306 (i.e. proximate to the base of the container) receives the tag identification data at a later time (e.g. 15:30:29.0). In an example, for a typical basket that has a depth of 30 cm, scanner 310 may be disposed 10 cm above the base of the container 306. The difference in time of the received tag identification data by each scanner 308, 310 can be used to determine if the product 302 has been placed inside the container 306. That is, if a scanner 308 attached proximate to the opening of the container 306 receives the tag identification data before a scanner 310 attached distant to the opening of the container 306, it is likely that a product 302 is being placed into the container 306. Each of the scanners 308, 310 also has a unique scanner identification data that can be used to differentiate one scanner from another and also to identify its position on the container 306.

It will be appreciated by those skilled in the art that the beam width of each scanner 308, 310 is dependent on the respective gain. Accordingly, to ensure that the scanners 308, 310 read the RFID tag 304 at different times, the beam width may be narrowed and/or the separation between the scanners 308, 310 may be increased.

FIG. 3B is a schematic graph showing the receipt of tag identification data according to an example embodiment. The top scanner 308 first receives a tag identification data 302a at 15:30:28.2 and as the product 302 falls towards the base of the container 306, the bottom scanner 310 receives tag identification data 304a at 15:30:29.0. Together with scanner identification data from each scanner, a computer server can determine that the product 302 is travelling in the downward direction and the presence of the product 302 in the container 306.

FIG. 3C shows a schematic diagram of a system for detecting a presence of a product in a container according to an example embodiment. In the Figure, scanner 308b may be tilted upwards towards the opening of a container 306b and scanner 310b may be tilted downwards towards the base of the container 306b. As compared to FIG. 3A, the tilting of the scanners 308b, 310b shown in FIG. 3C allows the scanners 308b, 310b to be disposed nearer to one another while still ensuring that the RFID tag 304 is detected at different times by the scanners 308b, 310b. For example, the distance between scanner 308b and scanner 310b may be 5 cm (as shown in FIG. 3C) instead of 10 cm (as shown in FIG. 3A).

FIG. 3D is a schematic graph showing the receipt of tag identification data according to an example embodiment. The top scanner 308b first receives a tag identification data 302c at 15:30:28.2 and as the product 302b falls towards the base of the container 306b, the bottom scanner 310b receives tag identification data 304c at 15:30:29.0. Together with scanner identification data from each scanner, a computer server can determine that the product 302b is travelling in the downward direction and the presence of the product 302b in the container 306b.

Figure 4B:
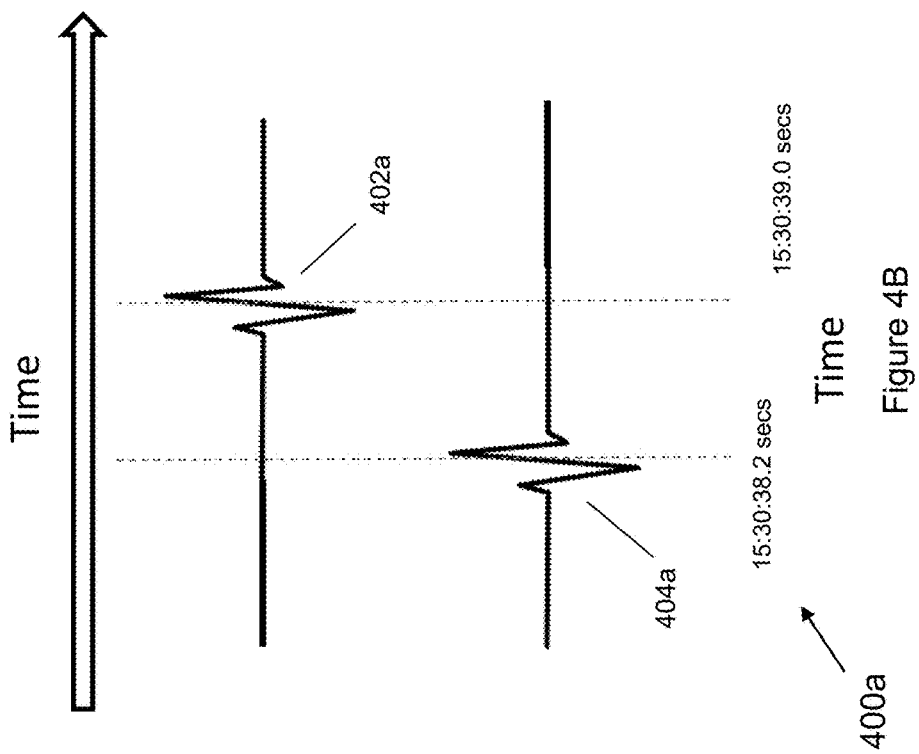
FIG. 4B is a schematic graph showing the receipt of tag identification data according to an example embodiment.
Figure 4A:
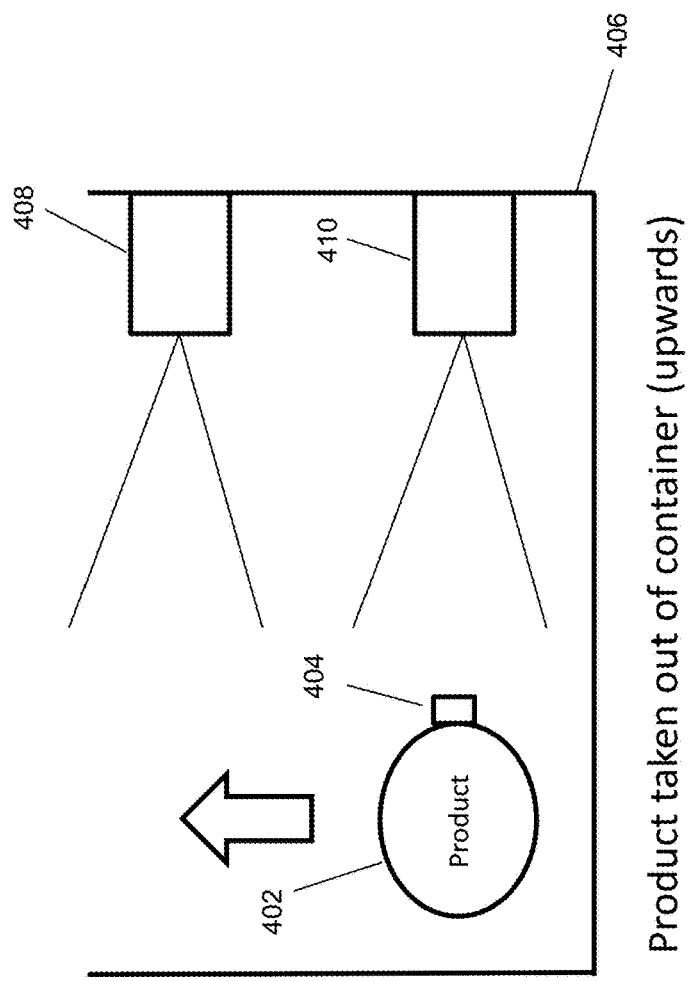
FIG. 4A shows a schematic diagram of a system for detecting a removal of a product from a container according to an example embodiment.

FIG. 4A shows a schematic diagram of a system for detecting a removal of a product from a container according to an example embodiment. In this example, a consumer wishes to remove a product 402 (with a RFID tag 404 attached thereon) from the container 406. The scanner 410 that is attached distant to the opening of the container 406 first receives a tag identification data from the RFID tag 404 at a certain time (e.g. 15:30:38.2). As the product 402 is removed from the container 406, a second scanner 408 that is attached proximate to the opening of the container 406 receives the tag identification data at a later time (e.g. 15:30:39.0). The difference in time (e.g. 0.8 sec) of the received tag identification data by each scanner 408,410 can be used to determine if the product 402 is removed from the container 406. That is, if a scanner 410 attached distant to the opening of the container 406 receives the tag identification data before a scanner 408 attached proximate to the opening of the container 406, it is likely that a product 402 is being removed from the container 406. It would be appreciated that the scanner arrangement in FIG. 3C can also be used for detecting removal of the product 402 from the container 406.

FIG. 4B is a schematic graph showing the receipt of tag identification data according to an example embodiment. The bottom scanner 410 first receives a tag identification data 404a at 15:30:38.2 and as the product 402 travels upwards towards the opening of the container 406, the top scanner 408 receives the same tag identification data 402a at 15:30:39.0. Together with scanner identification data from each scanner, a computer server can determine that the product 402 is travelling in the upward direction and the product 402 is being removed from the container 406.

Figure 5:
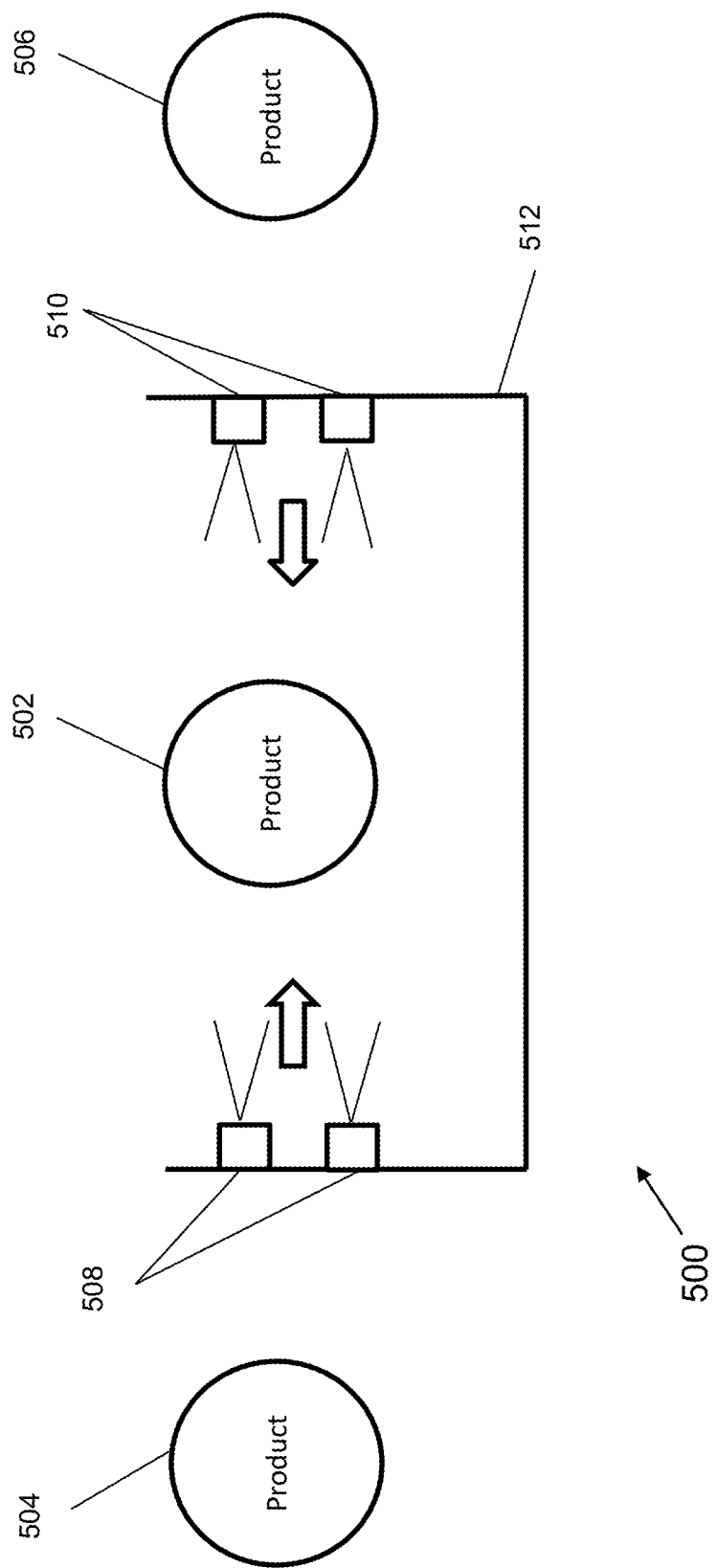
FIG. 5 shows a schematic diagram of a system for detecting a presence of a product inside or outside of a container according to an example embodiment.

RFID scanners can detect tag identification data within a field radius from 6 meters to 300 meters. As there are various items with attached RFID tags on shelves in a supermarket, it is preferable that RFID scanners are able to correctly determine the presence of a product inside a container. Further, RFID scanners can be configured such that the radio waves emitted therefrom are directional. This may be achieved by configuring the antenna(s) in the RFID scanners to transmit the radio waves in a particular direction. For example, with reference to FIG. 5, the RFID scanners 508 are emitting radio waves to the right, i.e. towards the interior of the container 512. FIG. 5 shows a schematic diagram of a system for detecting a presence of a product inside or outside of a container according to an example embodiment. In the Figure, four scanners are provided in which two scanners 508 are attached to the left side boundary of the container 512 and the other two scanners 510 are attached to the right side boundary of the container 512. When a product 502 is placed in the container 512, i.e. within the left side boundary and the right side boundary of the container 512, the two left scanners 508 and the two right scanners 510 may receive tag identification data from the product 502. For example, when a consumer places the product 502 into the container 512, the product 502 moves downwards towards the base of the container 512. The left and right scanners 508, 510 are expected to receive tag identification data of the product 502

In contrast, if only one pair of scanners detect movement of a product, this may indicate that a product is outside the container (e.g. on a supermarket shelf). As shown in FIG. 5, for a product 504 that is outside the container 512 (i.e. on the left side), the pair of left scanners 508 may not receive tag identification data from the product 504 and therefore may not detect the presence of the product 504 in the container 512 because the scanners 508 are facing right (towards the interior of the container 512). This may indicate that the product 504 is outside of the container 512. Similarly, the pair of right scanners 510 may not receive tag identification data from the product 506 and therefore may not detect the presence of the product 506 in the container 512, because the scanners 510 are facing to the left (towards the interior of the container 512). This may indicate the product 506 is outside of the container 512.

Two or more pairs of scanners may be used to improve the accuracy of detecting the presence of a product in a container. FIG. 6A shows a top view of a container for use in facilitating detection and payment of a product according to an example embodiment. In this Figure, four pairs of scanners 606 are attached to the boundaries of the container 604 to improve the accuracy of detecting a presence of a product 602 in the container 604. For example, if two scanners are not working or if some objects are blocking two scanners, the remaining six scanners may still be able to receive the tag identification data. Specific rules can be implemented, such as (but not limited to): if any three out of the four pairs of scanners 606 receive tag identification data to indicate that the product 602 is moving downwards, it can be considered that the product 602 is put into the container 604; or if any three out of the four pairs of scanners 606 receive tag identification data to indicate that the product 602 is moving upwards, it can be considered that the product 602 is removed from the container 604.

FIG. 6B shows a perspective view of a container for use in facilitating detection and payment of a product according to an example embodiment. As shown in the Figure, eight scanners 606a (four pairs, which is similar to FIG. 6A) can be used to improve detection accuracy by minimizing false readings when detecting the presence of the product in the container 604a.

Figure 7:
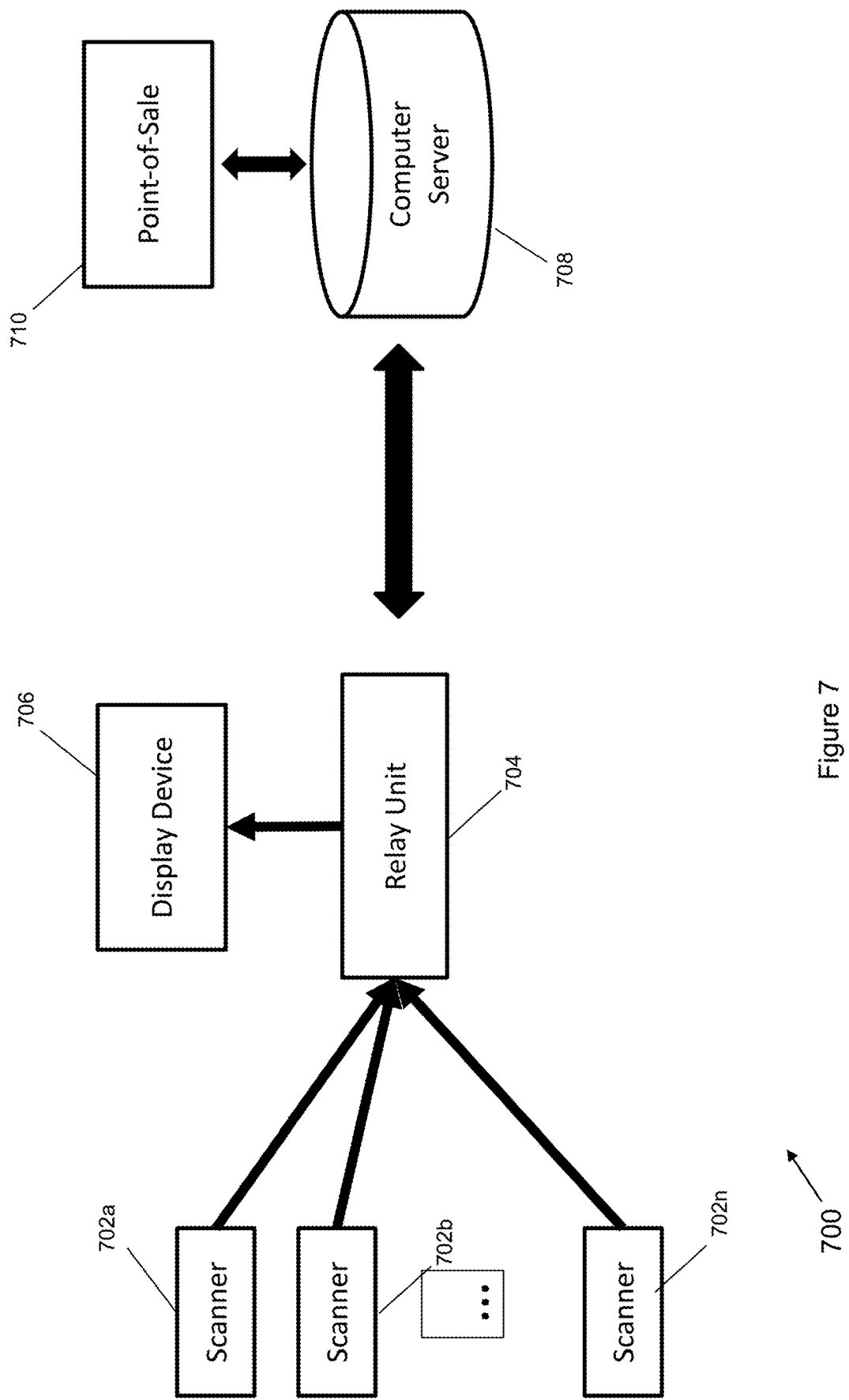
FIG. 7 shows a schematic diagram of a network-based system with a relay unit for facilitating detection and payment of a product according to an example embodiment.

FIG. 7 shows a schematic diagram of a network-based system with a relay unit for facilitating detection and payment of a product according to an example embodiment. In this Figure, a plurality of scanners 702a, 702b . . . 702n are each communicatively coupled to a relay unit 704. After receiving tag identification data of the product, each of the plurality of scanners 702a, 702b . . . 702n is configured to generate a signal associated with the tag identification data, a time of receipt of the tag identification data and scanner identification data. The relay unit 704 is configured to receive the generated signals from each of the scanners 702a, 702b . . . 702n. The relay unit 704 is further communicatively coupled to a computer server 708 and configured to relay the received signals from the scanners 702a, 702b . . . 702n to the computer server 708. The relay unit 704 can be a local proxy server that acts as an intermediary between the scanners 702a, 702b . . . 702n and the computer server 708 when the generated signals from the scanners 702a, 702b . . . 702n are out of range of the computer server 708 to be wirelessly transmitted.

In the Figure, the computer server 708 is communicatively coupled to Point-of-Sale (POS) terminals (only one is shown in FIG. 7—710). The computer server 708 receives the generated signals from the scanners 702a, 702b . . . 702n through the relay unit 704. The computer server 708 determines the presence of the product in the container based on the generated signals and rules as described above with respect to FIGS. 3A, 3B, 3C, 3D, 4A, 4B, 5, 6A and 6B. Subsequently, the computer server 708 identifies the products from the generated signals. After the computer server 708 has identified the presence of the products and retrieves the corresponding product data from a database, the computer server 708 calculates the total price (monetary amount) of the products in the container and sends the calculated total price to the POS terminal 710 for payment at the supermarket self-checkout counters.

The relay unit 704 may be further communicatively coupled to a display device 706, where the display device 706 is configured to display the price of the identified product. The computer server 708 may also send the calculated total price of the products in the container to the relay unit 704, which is subsequently relayed to the display device 706. For example, the display device 706 is attached to the shopping basket so that the consumer is able to know, through the display device 706, the products in his shopping basket and the price of each product that he wishes to purchase. The display device 706 may be a consumer's mobile phone. After the consumer has picked up the basket and pairs his/her mobile phone 706 with the basket relay unit 704, product information corresponding to the product inside the container may be displayed on the consumer's mobile phone 706. The display device 706 may also display the calculated total price of the products in his shopping basket to facilitate payment of the products at the POS terminal 710 located at the self-checkout counters. The consumer may therefore be able to know how much to pay before check-out at the POS terminal 710. If the display device 706 is the consumer's mobile phone, the consumer can make the payment from his/her mobile phone 706 directly without going through a cashier. After payment is completed, a digital receipt may be sent to the consumer's mobile phone 706 as a form of acknowledgement.

Figure 8:
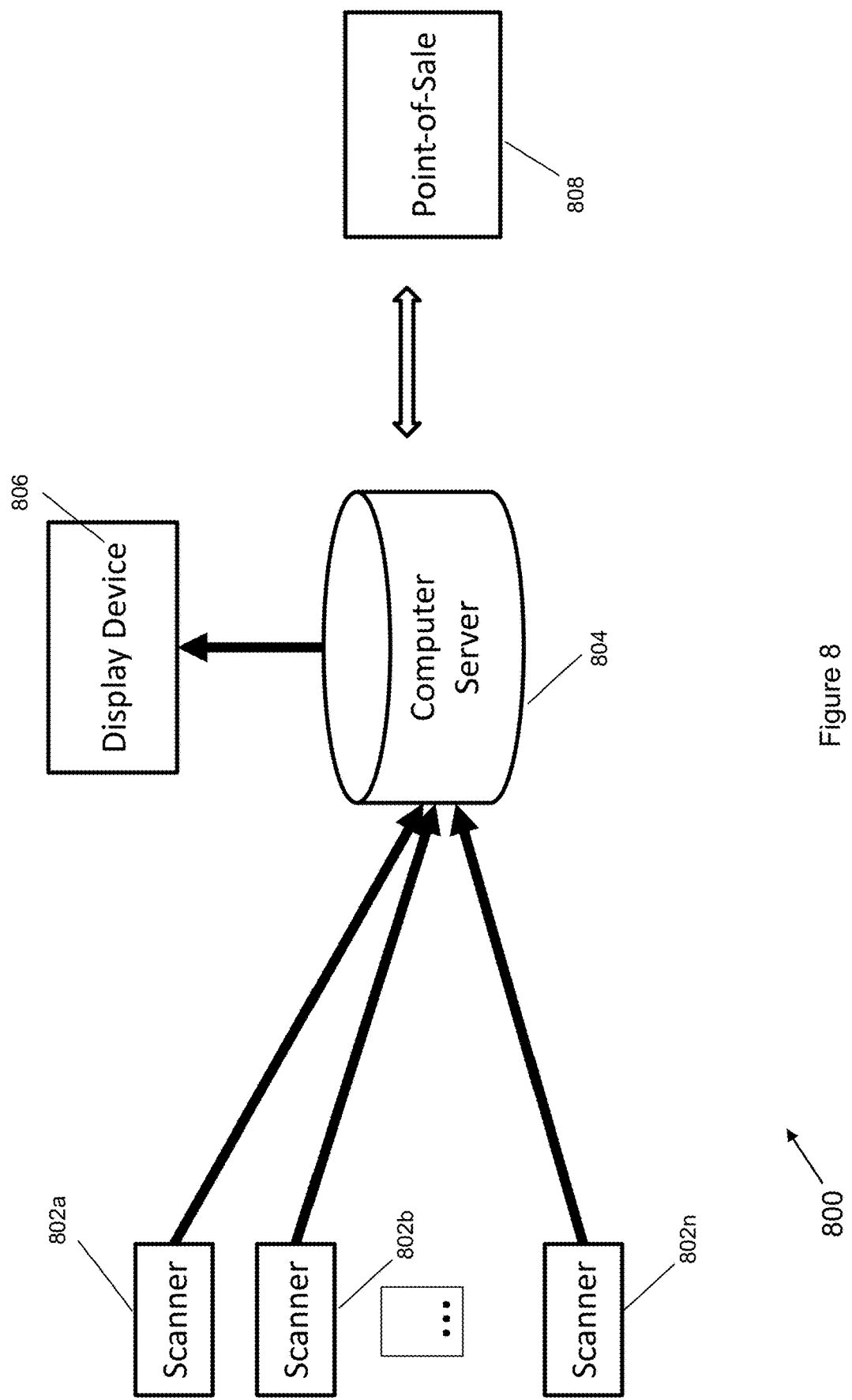
FIG. 8 shows a schematic diagram of a network-based system for facilitating detection and payment of a product according to an example embodiment.

FIG. 8 shows a schematic diagram of a network-based system for facilitating detection and payment of a product according to an example embodiment. In this Figure, the scanners 802a, 802b . . . 802n are directly coupled to the computer server 804. The computer server 804 is further communicatively coupled to a display device 806 and a Point-of-Sale terminal 808. When the computer server 804 receives the signals generated by the scanners 802a, 802b . . . 802n, the computer server 804 can identify and determine the presence of a product in the container. The computer sever 804 can further calculate the total price of the products in the container based on the presence of the products in the container. The product data and total price are subsequently displayed on the display device 806 that is attached to the container. The product data and the calculated total price can also be displayed at the Point-of-Sale terminal 808 in order to facilitate payment of the product during checkout.

The Point-of-Sale terminal 808 and display device 806 can also be realized as a single device such as a mobile telecommunication device of the consumer. For example, the consumer's mobile telephone is communicatively coupled to the computer server 804 and is capable of displaying the product data and the total price of the products in his shopping basket. When the consumer has finished shopping and is ready to pay, he may be able to know the total price of the products in his shopping basket through his mobile phone and can subsequently use his mobile phone (with a suitable mobile application installed) to pay before his leaves the supermarket. In this way, an efficient payment process may be achieved which may reduce the queues required at cashiers and self-checkout counters at the supermarkets.

Figure 9:
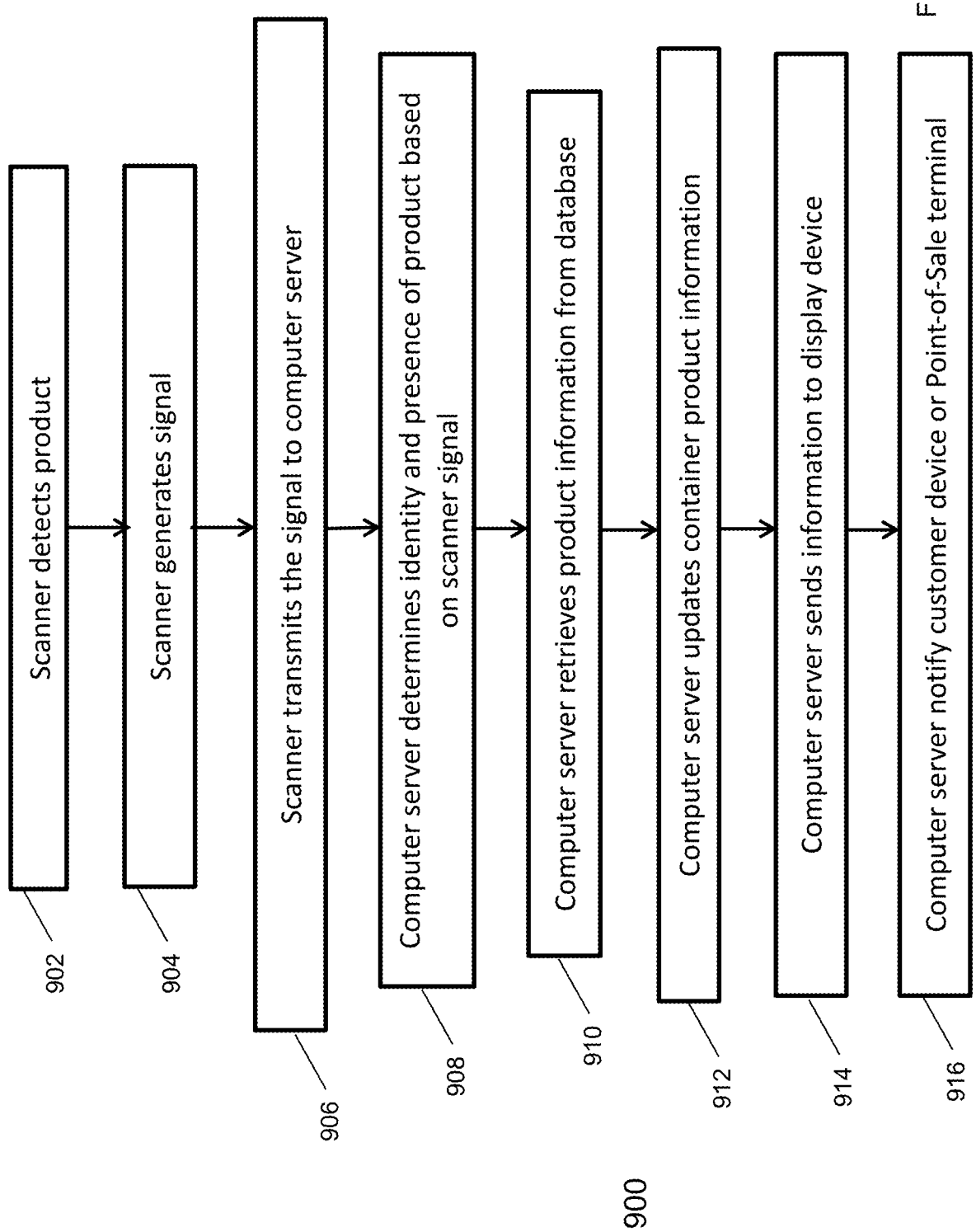
FIG. 9 shows a flow chart illustrating a method for facilitating detection and payment of a product according to an example embodiment.

FIG. 9 shows a flow chart illustrating a method for facilitating payment of a product according to an example embodiment. At step 902, a plurality of scanners attached to a container detects a product by receiving tag identification data from a tag that is attached to a product when the tag is within communication range of the scanners. At step 904, each of the plurality of scanners generate a signal that is associated with the tag identification data and a time receipt of the tag identification data. At step 906, each of the plurality of scanners transmits the generated signals to a computer server that is communicatively coupled with the scanners. Each generated signal may include scanner identification data that can be used to uniquely identify each scanner to differentiate one scanner from another. In an example, a scanner (e.g. scanner 102a described above) has a scanner identification data that identifies it as the top left scanner that is attached to particular supermarket trolley number "A1". That is, the scanner identification data may include the identity of the container that a particular scanner is attached to. In this manner, it is possible to implement various check-out/payment mechanisms for products that are placed inside the container.

At step 908, the computer server determines an identity of the product and a presence of the product in the container based on the signals, wherein the presence of the identified product can be used for facilitating detection and payment of the product.

At step 910, the computer server retrieves product data from a database that is communicatively coupled to the computer server. At step 912, the computer server calculates the total price of all the products in the container. At step 914, the computer server sends the product data and the calculated total price to a display device attached to the container or a mobile telecommunication device of the consumer. At step 916, the computer server sends the product data and the calculated total price to a Point-of-Sale terminal or the mobile telecommunication device of the consumer to facilitate payment of the products during check-out.

Figure 10:
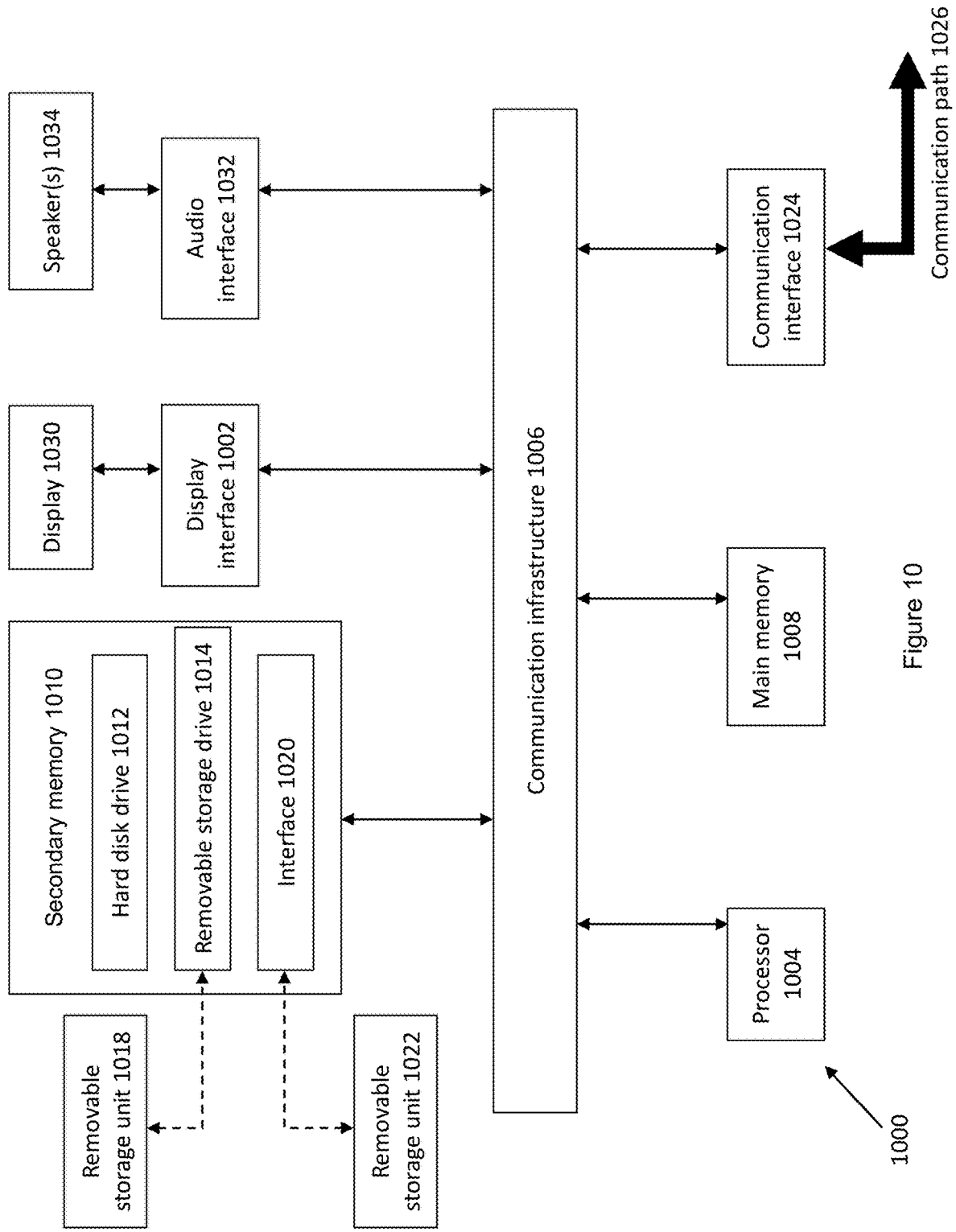
FIG. 10 shows a schematic diagram of a computer system that may be used to realize a computer server.

FIG. 10 depicts an exemplary computing device 1000, hereinafter interchangeably referred to as a computer system 1000, where one or more such computing devices 1000 may be used to (at least partially) realize the computer server 110, 204, 708, 804. The following description of the computing device 1000 is provided by way of example only and is not intended to be limiting.

As shown in FIG. 10, the example computing device 1000 includes a processor 1004 for executing software routines. Although a single processor is shown for the sake of clarity, the computing device 1000 may also include a multi-processor system. The processor 1004 is connected to a communication infrastructure 1006 for communication with other components of the computing device 1000. The communication infrastructure 1006 may include, for example, a communications bus, cross-bar, or network.

The computing device 1000 further includes a main memory 1008, such as a random access memory (RAM), and a secondary memory 1010. The secondary memory 1010 may include, for example, a hard disk drive 1012, which may be a hard disk drive, a solid state drive or a hybrid drive and/or a removable storage drive 1014, which may include a magnetic tape drive, an optical disk drive, a solid state storage drive (such as a USB flash drive, a flash memory device, a solid state drive or a memory card), or the like. The removable storage drive 1014 reads from and/or writes to a removable storage unit 1018 in a well-known manner. The removable storage unit 1018 may include magnetic tape, optical disk, non-volatile memory storage medium, or the like, which is read by and written to by removable storage drive 1014. As will be appreciated by persons skilled in the relevant art(s), the removable storage unit 1018 includes a computer readable storage medium having stored therein computer executable program code instructions and/or data.

In an alternative implementation, the secondary memory 1010 may additionally or alternatively include other similar means for allowing computer programs or other instructions to be loaded into the computing device 1000. Such means can include, for example, a removable storage unit 1022 and an interface 1020. Examples of a removable storage unit 1022 and interface 1020 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1022 and interfaces 1020 which allow software and data to be transferred from the removable storage unit 1022 to the computer system 1000.

The computing device 1000 also includes at least one communication interface 1024. The communication interface 1024 allows software and data to be transferred between computing device 1000 and external devices via a communication path 1026. In various embodiments, the communication interface 1024 permits data to be transferred between the computing device 1000 and a data communication network, such as a public data or private data communication network. The communication interface 1024 may be used to exchange data between different computing devices 1000 which such computing devices 1000 form part an interconnected computer network. Examples of a communication interface 1024 can include a modem, a network interface (such as an Ethernet card), a communication port (such as a serial, parallel, printer, GPIB, IEEE 1394, RJ45, USB), an antenna with associated circuitry and the like. The communication interface 1024 may be wired or may be wireless. Software and data transferred via the communication interface 1024 are in the form of signals which can be electronic, electromagnetic, optical or other signals capable of being received by communication interface 1024. These signals are provided to the communication interface via the communication path 1026.

As shown in FIG. 10, the computing device 1000 further includes a display interface 1002 which performs operations for rendering images to an associated display 1030 and an audio interface 1032 for performing operations for playing audio content via associated speaker(s) 1034.

As used herein, the term "computer program product" may refer, in part, to removable storage unit 1018, removable storage unit 1022, a hard disk installed in hard disk drive 1012, or a carrier wave carrying software over communication path 1026 (wireless link or cable) to communication interface 1024. Computer readable storage media refers to any non-transitory tangible storage medium that provides recorded instructions and/or data to the computing device 1000 for execution and/or processing. Examples of such storage media include magnetic tape, CD-ROM, DVD, Blu-Ray™ Disc, a hard disk drive, a ROM or integrated circuit, a solid state drive (such as a USB flash drive, a flash memory device, a solid state drive or a memory card), a hybrid drive, a magneto-optical disk, or a computer readable card such as a PCMCIA card and the like, whether or not such devices are internal or external of the computing device 1000. Examples of transitory or non-tangible computer readable transmission media that may also participate in the provision of software, application programs, instructions and/or data to the computing device 1000 include radio or infra-red transmission channels as well as a network connection to another computer or networked device, and the Internet or Intranets including e-mail transmissions and information recorded on Websites and the like.

The computer programs (also called computer program code) are stored in main memory 1008 and/or secondary memory 1010. Computer programs can also be received via the communication interface 1024. Such computer programs, when executed, enable the computing device 1000 to perform one or more features of embodiments discussed herein. In various embodiments, the computer programs, when executed, enable the processor 1004 to perform features of the above-described embodiments. Accordingly, such computer programs represent controllers of the computer system 1000.

Software may be stored in a computer program product and loaded into the computing device 1000 using the removable storage drive 1014, the hard disk drive 1012, or the interface 1020. Alternatively, the computer program product may be downloaded to the computer system 1000 over the communications path 1026. The software, when executed by the processor 1004, causes the computing device 1000 to perform functions of embodiments described herein.

It is to be understood that the embodiment of FIG. 10 is presented merely by way of example. Therefore, in some embodiments one or more features of the computing device 1000 may be omitted. Also, in some embodiments, one or more features of the computing device 1000 may be combined together. Additionally, in some embodiments, one or more features of the computing device 1000 may be split into one or more component parts.

It will be appreciated that the elements illustrated in FIG. 10 function to provide means for performing the various functions and operations of the servers as described in the above embodiments.

The use of RFID tags and scanners for facilitating payment of a product as described herein may result in shorter queues at cashiers and self-checkout counters. In contrast with current barcode scanners, RFID technology does not require line-of-sight to detect the RFID tags on the products. RFID tags can be attached to the exterior or interior of products and RFID scanners are still able to read the tags. This can significantly reduce the checkout time as products need not be individually removed from a supermarket basket and scanned. Further, RFID scanners have a high read-rate and have a longer range of up to 100 meters.

to detect RFID tags. Thus, products can be scanned easily and the calculated total price of the products can be readily shown on the visual device attached to the basket or on the mobile phone of the consumer. Therefore, payment of the products at self-checkout counters can be quickly carried out and queues at such counters can be significantly reduced.

In addition, RFID tags are robust and are able to withstand harsh environments. RFID scanners are still able to read the RFID tags attached onto products that are shrink-wrapped or laminated. Further, RFID scanners are also able to scan multiple RFID tags together, thereby reducing the amount of time required to scan each tag individually.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system for facilitating detection and payment of a product, the product having a radio frequency identification (RFID) tag attached thereon, the system comprising:
   two or more RFID scanners attachable to a container for holding the product, wherein each RFID scanner is configured to:
      (i) receive tag identification data from the RFID tag when the RFID tag is within communication range of the RFID scanner;
      (ii) generate a signal that is associated with the tag identification data and a time of receipt of the tag identification data; and
   a computer server communicatively coupled with the two or more RFID scanners, wherein the computer server is configured to:
      (i) receive the signals from the two or more RFID scanners; and
      (ii) determine an identity of the product and a presence of the product in the container based on the signals, wherein the presence of the identified product is used for facilitating payment of the product.

2. The system as claimed in claim 1, wherein each generated signal further comprises scanner identification data of a corresponding RFID scanner such that the computer server is further configured to determine an identity of the corresponding RFID scanner based on the signal.

3. The system as claimed in claim 1, wherein the system further comprises a database communicatively coupled to the computer server, the database having stored therein product data corresponding to the product, and wherein the computer server is further configured to retrieve the product data of the identified product from the database for facilitating payment of the product.

4. The system as claimed in claim 3, wherein the product data comprises a price of the product.

5. The system as claimed in claim 1, wherein at least one of the two or more RFID scanners is attached proximate to an opening of the container and at least one other of the two or more RFID scanners is attached distant to the opening of the container, wherein presence or absence of the product in the container is determinable based on the respective times of receipt of the signals from the at least one RFID scanner and the at least one other RFID scanner.

6. The system as claimed in claim 5, wherein the at least one RFID scanner that is attached proximate to the opening of the container is tilted upwards towards the opening of the container and the at least one other RFID scanner that is attached distant to the opening of the container is tilted downwards towards a base of the container.

7. The system as claimed in claim 1, wherein the system comprises at least four RFID scanners and the container is defined by a first and a second boundary, and at least two RFID scanners are attached to the first boundary and at least two other RFID scanners are attached to the second boundary such that the at least four RFID scanners receive the tag identification data to determine the presence of the product within the first and second boundaries.

8. The system as claimed in claim 1, wherein the RFID tag and each of the RFID scanners comprise a High Frequency (HF) or an Ultra-High Frequency (UHF) scanner.

9. The system as claimed in claim 1, wherein the system further comprises a relay unit communicatively coupled with each of the RFID scanners and the computer server and configured to receive the generated signals from each of the RFID scanners and to relay the generated signals to the computer server.

10. The system as claimed in claim 4, wherein the system further comprises a Point-of-Sale (POS) terminal communicatively coupled with the computer server and configured to retrieve the price of the identified product data from the database for facilitating payment of the product.

11. The system as claimed in claim 1, wherein the container comprises a basket or cart or trolley.

12. The system as claimed in claim 4, wherein the system further comprises a display device that is communicatively coupled to the computer server and configured to display the price of the identified product data or a total price of all products in the container for facilitating payment of the product.

13. The system as claimed in claim 1, wherein the computer server is configured to calculate the total price of each product in the container based on the presence of the product in the container and displays the calculated total price on the display device.

14. A method for facilitating detection and payment of a product, the product having a radio frequency identification (RFID) tag attached thereon, the method comprising:
- receiving, from two or more RFID scanners attachable to a container for holding the product, RFID tag identification data from the RFID tag when the RFID tag is within communication range of the scanner;
- generating, at each of the two or more RFID scanners, a signal that is associated with the RFID tag identification data and a time of receipt of the RFID tag identification data;
- transmitting, by the two or more RFID scanners, the signals to a computer server communicatively coupled with the RFID scanner; and
- determining, at the computer server, an identity of the product and a presence of the product in the container based on the signals, wherein the presence of the identified product is used for facilitating detection and payment of the product.

* * * * *